United States Patent Office
3,013,985
Patented Dec. 19, 1961

3,013,985
GROUP IB METAL CATALYSTS
Donald W. Breck, Tonawanda, and Robert M. Milton, White Plains, N.Y., assignors to Union Carbide Corporation, a corporation of New York
No Drawing. Filed Sept. 24, 1958, Ser. No. 762,955
7 Claims. (Cl. 252—455)

This invention relates to zeolitic molecular sieves containing at least one metal selected from the group consisting of copper, silver and gold which are suitable for use as improved catalysts.

Copper, silver and gold are well-known as hydrogenation and dehydrogenation catalysts. All three of these metals are useful as catalysts for the oxidation of alcohols to aldehydes or for the oxygenation of methane and other aliphatic hydrocarbons to get, for example, aldehydes.

It is an object of this invention to provide a new composition of matter which is a superior catalyst.

Other objects will be apparent from the subsequent disclosure and appended claims.

The composition of matter which satisifies the objects of the present invention comprises a zeolitic molecular sieve containing a substantial quantity of at least one metal selected from the group consisting of copper, silver and gold in the internal adsorption area of the zeolitic molecular sieve. This composition of matter contains the metal in a form having a high specific surface which is suitable for chemisorption and catalysis.

Zeolitic molecular sieves, both natural and synthetic, are metal aluminosilicates. The crystalline structure of these materials is such that a relatively large adsorption area is present inside each crystal. Access to this area may be had by way of openings, or pores, in the crystal. Molecules are selectively adsorbed by molecular sieves on the basis of their size and polarity, among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied will be available for adsorption of molecules having a size, shape, and energy which permits entry of the absorbate molecules into the pores of the molecular sieves.

The zeolitic molecular sieves to be useful in the present invention, must be capable of adsorbing oxygen molecules at the normal boiling point of oxygen. Included among these are the preferred natural zeolitic molecular sieves, chabazite, faujasite, erionite, mordenite, gmelinite, and the calcium form of analcite, and the preferred synthetic zeolitic molecular sieves, zeolite A, D, L, R, S, T, X and Y. The natural materials are adequately described in the chemical art. The characteristics of the synthetic materials and processes for making them are provided below.

The general formula for zeolite X, expressed in terms of mol fractions of oxides, is as follows:

0.9±0.2M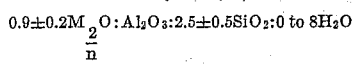O:Al₂O₃:2.5±0.5SiO₂:0 to 8H₂O

In the formula "M" represents a cation, for example hydrogen or a metal, and "n" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented in the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is 0.9 Na₂O:Al₂O₃:2.5 SiO₂:6.1H₂O

The major lines in the X-ray diffraction pattern of zeolite X are set forth in Table A below:

TABLE A

| d Value of Reflection in A. | 100 I/I₀ |
| --- | --- |
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the KoC doublet of copper, and a Geiger counter spectrometer with a strip chart pen recorder was used. The peak heights, I, and the positions as a function of 2θ, where θ is the Bragg angle, were read from the spectrometer charge. From these, the relative intensities, $$\frac{100I}{I_0}$$

where $I_0$ is the intensity of the strongest line or peak, and d (obs), the interplanar spacing in A., corresponding to the recorded lines were calculated. The X-ray patterns indicate a cubic unit cell of dimensions between 24.5 A. and 25.5 A.

To make sodium zeolite X, reactants are mixed in aqueous solution and held at about 100° C. until the crystals of zeolite X are formed. Preferably the reactants should be such that in the solution the following ratios prevail:

| | |
|---|---|
| SiO₂/Al₂O₃ | 3–5 |
| Na₂O/SiO₂ | 1.2–1.5 |
| H₂O/Na₂O | 35–60 |

The general formula for zeolite A, expressed in terms of mol fractions of oxides is as follows:

1.0±0.2M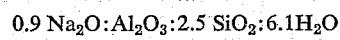O:Al₂O₃:1.85±0.5SiO₂:YH₂O

In the formula, "M" represents a metal and "n" its valence, and "Y" may be any value up to 6. The zeolite is activated, or made capable of adsorbing certain molecules by the removal of water from the crystal, as by heating. Thus the actual number of mols of water present in the crystal will depend upon the degree of dehydration or activation of the crystal.

As in the case of zeolite X, the metal represented in the formula by the letter "M" can be changed by conventional ion-exchange techniques. For purposes of convenience the sodium form of zeolite A, designated sodium zeolite A, is synthesized and other forms obtained by the modification of the sodium zeolite A.

A typical formula for sodium zeolite A is $$0.99Na_2O:1.0Al_2O_3:1.85SiO_2:5.1H_2O$$

The major lines in the X-ray diffraction pattern of zeolite A are set forth in Table B below:

TABLE B

| $d$ Value of Reflection in A. | 100 $I/I_0$ |
|---|---|
| 2.2±0.2 | 100 |
| 1.6±0.2 | 69 |
| 1.05±0.15 | 35 |
| 1.07±0.08 | 36 |
| 1.68±0.07 | 53 |
| 1.38±0.06 | 16 |
| 1.26±0.05 | 47 |
| 1.96±0.05 | 55 |
| 1.73±0.05 | 12 |
| 1.60±0.05 | 22 |

The same procedures and techniques were employed in obtaining the patterns described in Tables A and B.

To make sodium zeolite A, reactants are mixed in aqueous solution and heated at about 100° C. until the crystals of zeolite A are formed. Preferably the reactants should be such that in the solution the following ratios prevail:

$SiO_2/Al_2O_3$ ——————————————— 0.5–1.3
$Na_2O/SiO_2$ ——————————————— 1.0–3.0
$H_2O/Na_2O$ ——————————————— 35–200

The chemical formula for zeolite Y expressed in terms of oxides mole ratios may be written as $$0.9\pm0.2Na_2O:Al_2O_3:WSiO_2:XH_2O$$

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in Table C. The values for the interplanar spacing, $d$, are expressed in angstrom units. The relative intensity of the lines of the X-ray powder diffraction data are expressed as VS, very strong; S, strong; M, medium; W, weak; and VW, very weak.

TABLE C

| $hkl$ | $h^2+k^2+l^2$ | $d$ in A. | Intensity |
|---|---|---|---|
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–5.08 | M |
| 440 | 32 | 4.37–4.79 | M |
| 520 | 40 | 3.90–4.46 | W |
| 533 | 43 | 3.77–3.93 | S |
| 444 | 48 | 3.57–3.79 | VW |
| 551; 711 | 51 | 3.46–3.48 | VW |
| 642 | 56 | 3.30–3.33 | S |
| 553; 731 | 59 | 3.22–3.24 | W |
| 733 | 67 | 3.02–3.04 | M |
| 660, 822 | 72 | 2.91–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.75–1.78 | W |
| 997; 11, 9, 3 | 211 | 1.70–1.71 | W |

When an aqueous colloidal silica sol employed as the major source of silica, zeolite Y may be prepared by preparing an aqueous sodium aluminosilicate mixture having a composition, expressed in terms of oxide-mole-ratios, which falls within one of the following ranges:

|  | Range 1 | Range 2 | Range 3 |
|---|---|---|---|
| $Na_2O/SiO_2$ | 0.20 to 0.40 | 0.41 to 0.61 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole ratios, falling within one of the following ranges:

|  | Range 1 | Range 2 | Range 3 |
|---|---|---|---|
| $Na_2O/SiO_2$ | 0.6 to 1.0 | 1.5 to 1.7 | 1.9 to 21 |
| $SiO_2/Al_2O_3$ | 8 to 30 | 10 to 30 | about 10 |
| $H_2O/Na_2O$ | 12 to 90 | 20 to 90 | 40 to 90 | maintaining the mixture at a temperature of about 100° C. until crystals are formed, and separating the crystals from the mother liquor.

The composition of zeolite L, expressed in terms of mole ratios of oxides, may be represented as follows:

$$1.0\pm0.1\frac{M_2}{n}O:Al_2O_3:6.4\pm0.5SiO_2:yH_2O$$

wherein "M" designates a metal, "$n$" represents the valence of "M"; and "$y$" may be any value from 0 to about 7.

The more significant $d$(A.) values, i.e., interplanar spacings, for the major lines in the X-ray diffraction pattern of zeolite L, are given below in Table D.

TABLE D

| | |
|---|---|
| 16.1±0.3 | 3.17±0.01 |
| 7.52±0.04 | 3.07±0.01 |
| 6.00±0.02 | 2.91±0.01 |
| 4.57±0.03 | 2.65±0.01 |
| 4.35±0.04 | 2.46±0.01 |
| 3.91±0.02 | 2.42±0.01 |
| 3.47±0.02 | 2.19±0.01 |
| 3.28±0.02 | |

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal aluminosilicate mixture having a composition, expressed in terms of mole ratios of oxides falling within the following range:

$K_2O/(K_2O+Na_2O)$ _____ From about 0.33 to about 1.
$(K_2O+Na_2O)/SiO_2$ _____ From about 0.4 to about 0.5.
$SiO_2/Al_2O_3$ _____ From about 15 to about 28.
$H_2O/(K_2O+Na_2O)$ _____ From about 15 to about 41.

maintaining the mixture at a temperature of about 100° C. until crystallization occurs, and separating the crystals from the mother liquor.

The chemical formula for zeolite D may be written, in terms of oxides, as follows:

$$0.9 \pm 0.2[x\text{Na}_2\text{O}:(1-x)\text{K}_2\text{O}]:\text{Al}_2\text{O}_3:w\text{SiO}_2:y\text{H}_2\text{O}$$

wherein "$x$" is a value from 0 to 1, "$w$" is from about 4.5 to about 4.9, and "$y$," in the fully hydrated form, is about 7. In the preferred form of zeolite $d$, "$x$" is in the range of from 0.4 to 0.6.

Zeolite D has an X-ray powder diffraction pattern substantially like that shown in Table E.

TABLE E

*X-ray diffraction patterns of zeolite D*

[$d$=interplanar spacing in A.: I/I max.=relative intensity]

| Zeolite D | |
|---|---|
| $d$, A. | I/I max. |
| 9.42 | 66 |
| 6.89 | 67 |
| 5.54 | 15 |
| 5.03 | 62 |
| 4.33 | 62 |
| 3.98 | 27 |
| 3.89 | 23 |
| 3.60 | 12 |
| 3.45 | 39 |
| 3.19 | 15 |
| 2.94 | 100 |
| 2.69 | 9 |
| 2.61 | 38 |
| 2.30 | 16 |
| 2.09 | 22 |
| 1.81 | 29 |
| 1.73 | 23 |

Zeolite D may be prepared as follows:

A sodium-potassium aluminosilicate-water mixture is prepared such that the initial composition of the reactant mixture in terms of oxide-mole-ratios is:

$$\frac{\text{Na}_2\text{O}+\text{K}_2\text{O}}{\text{SiO}_2} = 0.45 \text{ to } 0.65$$

$$\frac{\text{Na}_2\text{O}}{\text{Na}_2\text{O}+\text{K}_2\text{O}} = 0.74 \text{ to } 0.92$$

$$\frac{\text{SiO}_2}{\text{Al}_2\text{O}_3} = \text{about } 28$$

$$\frac{\text{H}_2\text{O}}{\text{Na}_2\text{O}+\text{K}_2\text{O}} = 18 \text{ to } 45$$

The mixture is maintained at a temperature within the range of about 100° C. to 120° C. until crystals are formed; the crystals are then separated from the mother liquor.

The chemical formula for zeolite R may be written as:

$$0.9 \pm 0.2\text{Na}_2\text{O}:\text{Al}_2\text{O}_3:W\text{SiO}_2:X\text{H}_2\text{O}$$

wherein "W" is from 3.45 to 3.65, and "X," for the fully hydrated form, is about 7.

Zeolite R has an X-ray powder diffraction pattern substantially like that shown in Table F.

TABLE F

*X-ray diffraction patterns of zeolite R*

[$d$=interplanar spacing in A.: I/I max.=relative intensity]

| Zeolite R | |
|---|---|
| $d$, A. | 100 (I/I max.) |
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 3.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

Zeolite R may be prepared as follows:

A sodium aluminosilicate-water mixture is prepared such that the initial composition of the reactant mixture, in terms of oxide-mole-ratios, falls within any one of the following seven ranges:

| | I | II | III | IV | V | VI | VII |
|---|---|---|---|---|---|---|---|
| Na₂O/SiO₂ | 0.20 to 0.40 | 0.41 to 0.60 | 0.61 to 0.80 | 0.81 to 1.0 | 0.81 to 1.0 | 1.7 to 1.9 | 1.2 to 1.4 |
| SiO₂/Al₂O₃ | about 4 | 3.5 to 6.0 | 3.5 to 6.5 | 3 to 4.5 | about 30 | 10 to 25 | about 6 |
| H₂O/Na₂O | 22 to 60 | 30 to 60 | 40 to 80 | 40 to 80 | 50 to 60 | 60 to 70 | 80 to 90 |

The mixture is maintained at a temperature with the range of about 100° C. to 120° C. until crystals are formed; the crystals are then separated from the mother liquor.

The chemical formula for zeolite S may be written as:

$$0.9 \pm 0.2 Na_2O : Al_2O_3 : WSiO_2 : XH_2O$$

wherein "W" is from 4.6 to 5.9 and "X," for the fully hydrated form, is from about 6 to 7.

Zeolite S has a characteristic X-ray powder diffraction pattern which may be employed to identify zeolite S. The X-ray powder diffraction data are shown in Table G.

TABLE G

*X-ray diffraction patterns of synthetic zeolite S*

[$d$=interplanar spacing in A.: I/I max.=relative intensity]

| $d$, A. | 100 (I/I max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 |

Zeolite S may be prepared by preparing a sodium aluminosilicate-water mixture such that the composition of the reactant mixture, in terms of oxide-mole ratios, falls within the following range when the source of silica is an aqueous colloidal silica sol:

| | |
|---|---|
| $Na_2O/SiO_2$ | 0.3 to 0.6 |
| $SiO_2/Al_2O_3$ | 6 to 10 |
| $H_2O/Na_2O$ | 20 to 100 | and falls within the following range when the source of silica is sodium silicate:

| | |
|---|---|
| $Na_2O/SiO_2$ | About 0.5 |
| $SiO_2/Al_2O_3$ | About 25 |
| $H_2O/Na_2O$ | About 18 | maintaining the mixture at a temperature in the range of from about 80° C. up to about 120° C., preferably at about 100° C., and at a pressure at least equal to the vapor pressure of water in equilibrium with the mixture of reactants until crystals are formed, and separating the crystals from the mother liquor.

The chemical formula for zeolite T may be written, in terms of mole ratios of oxides, as follows:

$$1.1 \pm 0.4[xNa_2O:(1-x)K_2O]:Al_2O_3 6.9 \pm 0.5 SiO_2 : yH_2O$$

wherein "$x$" may be any value from about 0.1 to about 0.8, and "$y$" may be any value from about 0 to about 8. Zeolite T may be identified and distinguished from other zeolites, and other crystalline substances, by its X-ray powder diffraction pattern. The data which are set forth below in Table H are for a typical example of zeolite T.

TABLE H

| Bragg Angle, $2\theta$ | Interplanar Spacing, $d$ (A.) | Relative Intensity, 100 $I/I_0$ |
|---|---|---|
| 7.72 | 11.45 | 100 |
| 9.63 | 9.18 | 4 |
| 11.74 | 7.54 | 13 |
| 13.35 | 6.63 | 54 |
| 14.74 | 6.01 | 2 |
| 15.44 | 5.74 | 6 |
| 17.78 | 4.99 | 2 |
| 19.43 | 4.57 | 8 |
| 20.46 | 4.34 | 45 |
| 21.35 | 4.16 | 3 |
| 21.78 | 4.08 | 2 |
| 23.27 | 3.82 | 16 |
| 23.64 | 3.76 | 56 |
| 24.28 | 3.67 | 1 |
| 24.82 | 3.59 | 30 |
| 26.04 | 3.42 | 2 |
| 26.92 | 3.31 | 16 |
| 28.04 | 3.18 | 12 |
| 28.29 | 3.15 | 18 |
| 30.47 | 2.93 | 11 |
| 31.15 | 2.87 | 38 |
| 31.38 | 2.85 | 45 |
| 33.41 | 2.68 | 11 |
| 34.32 | 2.61 | 2 |
| 35.83 | 2.51 | 8 |
| 36.09 | 2.49 | 13 |
| 39.26 | 2.30 | 2 |
| 40.81 | 2.21 | 6 |
| 42.61 | 2.12 | 5 |
| 43.33 | 2.09 | 3 |
| 45.58 | 1.99 | 2 |
| 46.30 | 1.96 | 2 |
| 48.17 | 1.89 | 8 |
| 48.84 | 1.86 | 2 |
| 49.61 | 1.84 | 4 |
| 51.44 | 1.78 | 8 |
| 51.58 | 1.77 | 5 |
| 52.29 | 1.75 | 2 |
| 53.68 | 1.71 | 3 |
| 55.40 | 1.66 | 9 |
| 58.03 | 1.59 | 5 |
| 60.82 | 1.52 | 1 |
| 61.48 | 1.51 | 2 |
| 63.29 | 1.47 | 3 |
| 66.24 | 1.41 | 1 |
| 67.65 | 1.38 | 3 |

Zeolite T may be prepared by preparing an aqueous sodium-potassium aluminosilicate mixture having a composition expressed in terms of mole ratios of oxides, falling within the following range:

| | |
|---|---|
| $Na_2O/(Na_2O+K_2O)$ | From about 0.7 to about 0.8. |
| $(Na_2O+K_2O)/SiO_2$ | From about 0.4 to about 0.5. |
| $SiO_2/Al_2O_3$ | About 20 to 28. |
| $H_2O/(Na_2O+K_2O)$ | About 40 to 42. | maintaining the mixture at a temperature of about 100° C. until crystallization occurs, and separating the crystals from the mother liquor.

Several methods are available for incorporating the copper, silver and gold in the zeolitic molecular sieve. The first of these comprises intimately contacting the zeolitic molecular sieve with an aqueous solution of a water-soluble salt of the metal to be deposited in the inner adsorption area of the zeolitic molecular sieve whereby ion-exchange of the metal cations of the zeolitic molecular sieve in the aqueous solution occurs; separating the zeolitic molecular sieve from the aqueous exchanging solution; drying the zeolitic molecular sieve whereby substantially all of the water is removed from the zeolitic molecular sieve; and intimately contacting the zeolitic molecular sieve with a reducing agent such as alkali metal vapors or gaseous hydrogen whereby the cations of the metal to be deposited i.e., the copper, silver and/or gold are reduced to the elemental metal.

To illustrate this process and the composition of matter of the present invention zeolite X powder (314 grams) was slurried at room temperature with two liters of 0.2 molar silver nitrate (containing 68 grams $AgNO_3$). After the exchange reaction was complete, the zeolite was washed with water until the wash effluent was free of silver-ions. The zeolite was then dried at 110° C. Chemical analysis of the zeolite indicated the presence of 11.3 percent silver.

The silver-exchanged zeolite X was heated in a nitrogen purge at 350° C. for 2 hours. After cooling the zeolite to 200° C., hydrogen was admitted to about 1 cubic foot per hour and the heating continued for one hour. The white silver-exchanged zeolite X turned black in the presence of hydrogen. An exposure of the silver-loaded zeolite X to air, after reduction, changed the color from black to yellow-brown. X-ray diffraction analysis of the product after reduction showed the crystal structure to be intact and the elemental silver present had a particle size of less than $10^{-6}$ centimeters.

In another example a solution of copper nitrate was prepared by dissolving 12.1 grams $Cu(NO_3)_2 \cdot 3H_2O$ in one liter of distilled water. This solution was mixed with 100 grams of zeolite X and allowed to stand for ten minutes. The zeolite was filtered and dried overnight at 100° C.

The copper-exchanged zeolite containing 3.0 weight-percent copper was placed in a horizontal tube furnace and heated under 2 cubic feet per hour hydrogen at 100–265° C. for eight hours and then at 235–450° C. for four hours. The bed color changed from light blue to pink-rose. Chemical analysis of the dried product indicated 3.5 weight percent copper. X-ray diffraction analysis of the product showed no crystallographic decomposition.

In still another example zeolite A powder (80 grams) was slurried at room temperature into 860 milliliters of 0.2 M silver nitrate solution (contained 28.2 grams $AgNO_3$). The mixture was allowed to stand about ½ hour and was then filtered. The solid was then washed with water until free of silver. The solid was then dried at 100° C.

The silver-exchanged zeolite A containing 19.9 weight-percent silver was placed in a horizontal tube furnace and dehydrated by heating at 350–400° C. for 1¾ hours. The zeolite was then cooled to room temperature. Hydrogen (0.5 cubic foot per hour) was passed through the bed for 20 minutes. The bed turned yellow-brown. The zeolite was heated to 100–200° C. while passing hydrogen through it for 25 minutes. The product had a uniformly dark brown color and contained 23.5 weight-percent silver. X-ray diffraction analysis of the silver A zeolite after reduction indicated that hydrogen exchange had occurred and that elemental silver was present.

A sample of mordenite (in the form of beach pebbles found in Nova Scotia) with an approximate composition of $RO \cdot Al_2O_3 \cdot 10SiO_2 \cdot 6H_2O$ where R is $(Na^+)_2$ and $Ca^{++}$, was ground to pass through a 150 mesh screen. A 7.6 gram portion of this powder was mixed with 150 milliliters aqueous solution containing 1.5 grams of silver nitrate. This mixture was allowed to stand with frequent agitation for 1½ hours. It was then filtered and washed with water until the filtrate gave a negative test for silver ion. The zeolite was dried at 110° C.

The silver-exchanged mordenite was placed in a horizontal tube furnace and heated at 350° C. for 3 hours in a stream of hydrogen gas. Chemical analysis of the product indicated that it contained 9.3 weight-percent silver. The structure of the crystal was indicated by X-ray diffraction techniques to be a hydrogen-exchanged form of mordenite.

Hydrated Cu(II) X zeolite (15 grams) containing 12.2 weight-percent Cu on an anhydrous basis was placed in a 1 inch Pyrex tube. The tube was controlled at 375° C. in a split tube furnace for 2½ hours in a stream of nitrogen. The tube was then cooled to 350° C. and a stream of carbon monoxide was continued for 2½ hours during which time the zeolite changed from light blue to light purple. The tube was then cooled to 350° C. and a stream of carbon monoxide was continued for 2½ hours during which time the zeolite changed from light blue to light purple. This color change is indicative of reduction. The sample was cooled in nitrogen. It was removed and submitted for analysis without exposure to air. The analysis showed 9.4 weight-percent copper metal on an anhydrous basis.

A sample of the same starting zeolite was treated under identical conditions of temperature and time with hydrogen instead of carbon monoxide. The reduction took place much more rapidly than with carbon monoxide. Analysis of this sample showed 9.8 weight-percent copper metal on an anhydrous basis.

Hydrated Cu(II) X zeolite (25 grams) containing 12.2 weight-percent Cu on an activated basis was suspended in 200 ml. distilled water in a 500 ml. 3-necked flask fitted with a condenser, a thermometer, and a stirrer. An inert atmosphere was maintained over the suspension. Hydrazine hydrochloride (5.25 grams, .05 mole) was added to the suspension. A solution of sodium hydroxide (4.0 grams, .1 mole) was added dropwise over a period of 30 minutes. Copious amounts of gas, presumably nitrogen, were evolved. The zeolite first turned colorless, probably forming the copper (I) X zeolite, and then deep red brown. The mixture was heated to 100° C. to insure complete reaction and destruction of excess hydrazine. The zeolite was filtered and washed with water and acetone under an inert atmosphere. It was extremely reactive in air, turning light blue in a few minutes. A sample was heated to 350° C. in vacuo for 2½ hours. No visible change occurred. Analysis showed 8.1 weight-percent copper metal on an anhydrous basis and less than 0.1 percent nitrogen.

Another method for obtaining the product of the present invention comprises contacting the zeolitic molecular sieve with an aqueous solution of a metal-amine, complex cation of copper, silver or gold whereby ion-exchange occurs between the complex cations and the exchangeable cations of the zeolitic molecular sieve; drying said ion-exchanged zeolitic molecular sieve; activating said dried, ion-exchanged zeolitic molecular sieve in an inert atmosphere; and reducing the complex cations in said activated zeolitic molecular sieve to the elemental metal by heating said zeolitic molecular sieve up to a temperature of about 350° C. in a flowing stream of inert dried gas or in vacuum whereby the complex cation is destroyed thereby depositing the metal in a very highly dispersed form in the inner adsorption area of said zeolitic molecular sieve and cooling the product. This method is limited to the loading of zeolitic molecular sieves which have a pore size sufficiently large to permit adsorption of benzene. Molecular sieves having smaller pores will not satisfactorily permit entry of the metal-amine complex cations into the inner adsorption area of the crystal.

To illustrate this process for the preparation of gold-loaded molecular sieves a suspension of 2.5 grams of sodium zeolite X in 10 milliliters of water and 100 milliliters of an aqueous solution containing one gram of bis(ethylenediamine) auric chloride

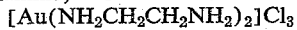
$[Au(NH_2CH_2CH_2NH_2)_2]Cl_3$ were mixed and the mixture was stirred for 40 minutes. The zeolite was filtered from the solution, washed thoroughly with distilled water and then with alcohol and ether. A gold loaded zeolite X was obtained by heating a portion of the above product at 375° C. without the necessity of a hydrogen atmosphere and another portion was treated at 375° C. with a hydrogen atmosphere. In both cases a gold-loaded zeolite containing approximately 15 weight-percent of gold was obtained.

It may be seen that the maximum metal that may be incorporated in the zeolitic molecular sieves in the foregoing ion-exchange processes is limited by the extent to which the molecular sieves may be ion-exchanged with the deposited cations. However, since the metal is distributed throughout the molecular sieves according to the location of the ion-exchange site of the crystals it is possible to obtain a high degree of dispersion of the metal throughout the crystals and the contained metal has a very high specific surface.

Still another method which is suitable for preparing the products of the present invention comprises intimately contacting an activated zeolitic molecular sieve in an inert atmosphere with a fluid decomposable compound of copper, silver or gold whereby the decomposable compound is adsorbed by the zeolitic molecular sieve in its inner adsorption region. The decomposable compound may then be reduced whereby the elemental metal is deposited and retained in the inner adsorption region. As with the foregoing method wherein ion-exchange with complex cations is employed, this process is limited to the loading of molecular sieves which are capable of adsorbing benzene.

Copper, silver and gold acetylacetonate complexes with the metal in the zerovalent state are suitable as the decomposable compounds. The reduction of the material may be either chemical or thermal. To illustrate this process copper acetylacetonate (1 gram) was dissolved in 50 milliliters of chloroform. To this solution was added 10 grams of activated zeolite X powder. The resulting slurry was allowed to stand for about 30 minutes. The powder was then filtered off and purged with dry hydrogen gas to remove the last traces of chloroform. The dry powder was heated to about 400° C. for 4 hours under a dry hydrogen purge to decompose the adsorbed copper salt. X-ray diffraction analysis of the resulting product indicated the retention of the zeolite X structure and the presence of copper in the zeolite X.

In addition to the uses described previously the metal-loaded molecular sieves find many varied applications. For example, copper-loaded molecular sieves may be employed as scavengers to remove gases such as carbon monoxide and oxygen from hydrogen. Silver-loaded molecular sieves provide suitable catalysts for the selective oxidation of organic compounds such as ethylene to ethylene oxide.

While it is true that in the utilization of these materials for catalytic purposes they have often been supported by alumina, silica, mixtures thereof and alumino-silicates, when contained in the inner adsorption area of molecular sieves as in the present application they provide superior catalysts because the products contain the metal in the finest possible distribution, the metal being in a highly active form. The molecular sieves have a higher surface area than any of the carrier supports. The uniform structure of the molecular sieves provide uniform activity throughout the entire catalytic surface. Further certain properties characteristic of zeolitic molecular sieves still further enhance the use of the metal-loaded products. For example, by properly selecting the pore size and the crystal structure by proper selection of molecular sieves it is possible to obtain the most favorable conditions for a given reaction even to the point of carrying on reactions in the presence of other materials which would normally interfere with the reaction. The selectivity of the various molecular sieves will in many cases exclude the interfering catalysts from the catalytic surface while in no way preventing the desired materials from contacting this surface. Further the chemical and catalytic nature of the molecular sieve itself may be altered to suit the requirements of the reactants by the selection of the most suitable cation present in the molecular sieve structure.

To illustrate the utility of the products of the present invention silver-loaded zeolite X was employed to remove thiophene from benzene. Zeolite X containing 13 percent silver effectively removed the thiophene in the vapor state by passing the vaporous material over a bed of the silver-containing zeolite. The preferred temperature is about 350° C. The zeolite may then be regenerated by burning off the thiophene in oxygen at an elevated temperature.

Similarly, copper-loaded molecular sieves have been found to be extremely useful getters for oxygen particularly in systems containing molecules of larger size than the pores of the zeolitic molecular sieve. The oxygen is removed without any contamination of the scavenging surface by the non-adsorbed materials.

As used herein the term "activation" is employed to designate the removal of water from the zeolitic molecular sieves, i.e., dehydration, and does not refer to catalytic activity. The zeolitic molecular sieves containing the elemental metal and/or metal oxides exhibit catalytic activity.

The product of the present invention has a surface area about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysis in the internal portion of the molecular sieve. Since this region is available only through pores of molecular size it may be seen that selective chemisorption and catalysis may be obtained in a system containing a mixture of molecules some of which are too large to enter the pores whereas others are capable of entering the pores.

Zeolite A is described and claimed in U.S. Patent No. 2,882,243, issued April 14, 1959 to R. M. Milton.

Zeolite D is described and claimed in U.S. patent application Serial No. 680,383, filed August 26, 1957.

Zeolite L is described and claimed in U.S. patent application Serial No. 711,565, filed January 28, 1958.

Zeolite R is described and claimed in U.S. patent application Serial No. 680,381, filed August 26, 1957.

Zeolite S is described and claimed in U.S. patent application Serial No. 724,843, filed March 31, 1958.

Zeolite T is described and claimed in U.S. patent application Serial No. 733,819, filed May 8, 1958, now U.S. Patent No. 2,950,952.

Zeolite X is described and claimed in U.S. Patent No. 2,882,244, issued April 14, 1959, to R. M. Milton.

Zeolite Y is described and claimed in U.S. patent application Serial No. 728,057, filed April 14, 1958.

The preferred compositions of matter for the present invention which have been found to be most satisfactory and useful for catalytic purposes are the metal-loaded zeolites A, X, Y, and faujasite.

Erionite is a naturally occurring zeolite, described originally by Eakle, Am. J. Science (4), 6, 66 (1898). It is most readily identified by its characteristic X-ray powder diffraction pattern. The $d$-spacings, in A., and relative intensities thereof, obtained on a well-crystallized specimen are tabulated below.

*X-Ray Powder Data, Erionite*

| $d$-spacing, A. | Relative Intensity, $I/I_0 \times 100$ |
|---|---|
| 11.38 | 100 |
| 9.06 | 10 |
| 7.50 | 10 |
| 6.56 | 40 |
| 6.24 | 10 |
| 5.68 | 10 |
| 5.34 | 10 |
| 4.56 | 10 |
| 4.31 | 40 |
| 4.15 | 20 |
| 3.80 | 20 |
| 3.74 | 40 |
| 3.58 | 30 |
| 3.30 | 10 |
| 3.27 | 10 |
| 3.20 | 10 |
| 3.16 | 10 |
| 3.14 | 10 |
| 3.00 | 5 |
| 2.92 | 5 |
| 2.86 | 30 |
| 2.83 | 30 |
| 2.805 | 20 |
| 2.67 | 10 |
| 2.59 | 5 |
| 2.49 | 10 |
| 2.47 | 10 |
| 2.20 | 5 |
| 2.11 | 5 |
| 1.88 | 5 |
| 1.83 | 5 |
| 1.77 | 10 |
| 1.65 | 10 |

What is claimed is:

1. As a new composition of matter, a dehydrated rigid three dimensional crystalline metal aluminosilicate zeolite of the molecular sieve type, such zeolite being capable of adsorbing oxygen internally at the normal boiling point of oxygen, containing at least one elemental metal selected from the group consisting of copper, silver and gold in the inner adsorption area of said crystalline metal aluminosilicate zeolite.

2. A composition of matter as described in claim 1 wherein the elemental metal is copper.

3. A composition of matter as described in claim 1 wherein the elemental metal is silver.

4. A composition of matter as described in claim 1 wherein the elemental metal is gold.

5. As a new composition of matter a dehydrated rigid three-dimensional crystalline metal aluminosilicate zeolite of the molecular sieve type chosen from the group consisting of zeolite A, zeolite D, zeolite L, zeolite R, zeolite S, zeolite T, zeolite X, zeolite Y, chabazite, faujasite, erionite, mordenite, gmelinite, and the calcium form of analcite containing at least one elemental metal chosen from the group consisting of copper, silver and gold in the inner adsorption area of said crystalline metal aluminosilicate zeolite.

6. A composition of matter as described in claim 5 wherein the rigid three dimensional crystalline metal aluminosilicate of the molecular sieve type is zeolite A.

7. A composition of matter as described in claim 5 wherein the rigid three dimensional crystalline metal aluminosilicate of the molecular sieve type is zeolite X.

References Cited in the file of this patent
UNITED STATES PATENTS

| | | |
|---|---|---|
| 1,840,450 | Jaeger et al. | Jan. 12, 1932 |
| 2,306,610 | Barrer | Dec. 29, 1942 |
| 2,413,134 | Barrer | Dec. 24, 1946 |
| 2,617,712 | Bond | Nov. 11, 1952 |
| 2,882,243 | Milton | Apr. 14, 1959 |
| 2,882,244 | Milton | Apr. 14, 1959 |